US011138432B2

(12) United States Patent
Holzer et al.

(10) Patent No.: US 11,138,432 B2
(45) Date of Patent: Oct. 5, 2021

(54) VISUAL FEATURE TAGGING IN MULTI-VIEW INTERACTIVE DIGITAL MEDIA REPRESENTATIONS

(71) Applicant: Fyusion, Inc., San Francisco, CA (US)

(72) Inventors: Stefan Johannes Josef Holzer, San Mateo, CA (US); Stephen David Miller, San Francisco, CA (US); Pantelis Kalogiros, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 213 days.

(21) Appl. No.: 15/604,938

(22) Filed: May 25, 2017

(65) Prior Publication Data

US 2018/0341808 A1 Nov. 29, 2018

(51) Int. Cl.
*G06K 9/00* (2006.01)
*G06F 16/583* (2019.01)
*G06F 16/587* (2019.01)
*G06K 9/62* (2006.01)

(52) U.S. Cl.
CPC ....... *G06K 9/00664* (2013.01); *G06F 16/583* (2019.01); *G06F 16/587* (2019.01); *G06K 9/6253* (2013.01)

(58) Field of Classification Search
None
See application file for complete search history.

(56) References Cited

U.S. PATENT DOCUMENTS

| 2006/0188147 | A1 | 8/2006 | Rai et al. |
| 2010/0171691 | A1 | 7/2010 | Cook et al. |
| 2011/0254835 | A1 | 10/2011 | Segal |
| 2013/0155180 | A1 | 6/2013 | Wantland et al. |
| 2013/0162634 | A1 | 6/2013 | Baik |
| 2013/0250045 | A1 | 9/2013 | Ki et al. |
| 2014/0023341 | A1* | 1/2014 | Wang ............... H04N 9/87 386/240 |

(Continued)

FOREIGN PATENT DOCUMENTS

WO 2015073570 A2 5/2015

OTHER PUBLICATIONS

Belongie, Serge, Jitendra Malik, and Jan Puzicha. "Shape matching and object recognition using shape contexts." IEEE Transactions on Pattern Analysis & Machine Intelligence 4 (2002): 509-522. (Year: 2002).*

(Continued)

*Primary Examiner* — Sean M Conner
(74) *Attorney, Agent, or Firm* — Kwan & Olynick LLP

(57) ABSTRACT

Provided are mechanisms and processes for visual feature tagging in multi-view interactive digital media representations (MIDMRs). In one example, a process includes receiving a visual feature tagging request that includes an MIDMR of an object to be searched, where the MIDMR includes spatial information, scale information, and different viewpoint images of the object. A visual feature in the MIDMR is identified, and visual feature correspondence information is created that links information identifying the visual feature with locations in the viewpoint images. At least one image associated with the MIDMR is transmitted in response to the feature tagging request.

15 Claims, 11 Drawing Sheets

(56) References Cited

U.S. PATENT DOCUMENTS

| | | | |
|---|---|---|---|
| 2015/0042812 A1* | 2/2015 | Tang | H04N 5/23206 348/157 |
| 2015/0130800 A1 | 5/2015 | Holzer et al. | |
| 2015/0130894 A1 | 5/2015 | Holzer et al. | |
| 2015/0134651 A1 | 5/2015 | Holzer et al. | |
| 2015/0138190 A1 | 5/2015 | Holzer et al. | |
| 2015/0242686 A1* | 8/2015 | Lenka | G06F 16/51 382/103 |
| 2015/0339846 A1* | 11/2015 | Holzer | G06F 16/532 345/419 |
| 2017/0278544 A1* | 9/2017 | Choi | G06F 3/04842 |
| 2018/0336737 A1* | 11/2018 | Varady | G06T 7/536 |

OTHER PUBLICATIONS

Russell, Bryan C., et al. "LabelMe: a database and web-based tool for image annotation." International journal of computer vision 77.1-3 (2008): 157-173. (Year: 2008).*

Utasi, Ákos, and Csaba Benedek. "A multi-view annotation tool for people detection evaluation." Proceedings of the 1st international workshop on visual interfaces for ground truth collection in computer vision applications. ACM, 2012. (Year: 2012).*

Li, Mingyang, Byung Hyung Kim, and Anastasios I. Mourikis. "Real-time motion tracking on a cellphone using inertial sensing and a rolling-shutter camera." 2013 IEEE International Conference on Robotics and Automation. IEEE, 2013. (Year: 2013).*

Nützi, Gabriel, et al. "Fusion of IMU and vision for absolute scale estimation in monocular SLAM." Journal of intelligent & robotic systems 61.1-4 (2011): 287-299. (Year: 2011).*

Chen, Shenchang E., "QuickTime VR—An Image-Based Approach to Virtual Environment Navigation", ACM, SIGGRAPH '95 Proceedings of the 22nd annual conference on Computer graphics and interactive techniques, 1995, 29-38.

Clare, Adam, "Reality is a Game; What is Skybox?", retrieved from the Internet <http://www.realityisagame.com/archives/1776/what-is-a-skybox/>, 5.

Golovinsk1y, Aleksey et al., "Shape-based Recognition of 3D Point Clouds in Urban Environment", IEEE, IEEE 12th International Conference on Computer Vision (ICCV), 2009, 2154-2161.

Gurdan, Tobias et al., "Spatial and Temporal Interpolation of Multi-View Image Sequences", Department of Computer Science, Technische Universitat Munchen Ascending Technologies GmbH, Krailing, Germany, Section 2.3, Image Warping and Blending; Retrieved from the Internet <https://vision.in.tum.de/_media/spezial/bib/gurdan-et-al-gcpr-2014.pdf>, 12.

Mian, Ajmal S. et al., "Three-Dimensional Model-Based Object Recognition and Segmentation in Cluttered Scenes", IEEE Transactions on Pattern Analysis and Machine Intelligence, col. 28, No. 10, Oct. 2006, 1584-1601.

Saito, Hideo et al., "View Interpolation of Multiple Cameras Based on Projective Geometry", Department of Information and Computer Science, Keio University and Presto, Japan Science and Technology Corporation (JST), retrieved from the Internet <http://citeseerx.ist.psu.edu/viewdoc/download?doi=10.1.1.6.5162&rep=rep1&type=pdf>, 6.

Schiller, Ingo et al., "Datastructure for Capturing Dynamic Scenes with a Time-of-Flight Camera", Springer-Verlad, Dyna3D 2009, LNCS 5742, 2009, 42-57.

Seitz, Steven M., "Image-Based Transformation of Viewpoint and Scene Appearance", A Dissertation submitted in partial fulfillment of the requirements for the Degree of Doctor of Philosophy at the University of Wisconsin; retrieved from the Internet <http://homes.cs.washington.edu/~seitz/papers/thesis.pdf>, 1997, 111.

Snavely, Noah et al., "Photo Tourism: Exploring Phot Collections in 3D", ACM, ACM Transactions on Graphics (TOG)—Proceeding of ACM SIGGRAPH 2006, vol. 25, Issue 3, Jul. 2006, 835-846.

Steder, Bastian et al., "Robust On-line Model-based Object Detection from Range Images", International Conference on Intelligent Robots and Systems, pp. 4739-4744, Oct. 15, 2009, 6 pages.

* cited by examiner

VISUAL FEATURE TAGGING IN MULTI-VIEW INTERACTIVE DIGITAL MEDIA REPRESENTATIONS

TECHNICAL FIELD

The present disclosure relates to the identification and tagging of features in a multi-view interactive digital media representation.

DESCRIPTION OF RELATED ART

Images tagging is commonly used to identify portions of an image that are of particular interest or meaning. For example, an image of a group of people may be associated with tags that identify each individual in the image. Such tags can provide supplemental metadata information that characterizes the visual information in the image.

However, because a single image provides limited information about an object, the usefulness of an image tag is limited by the information available in that single image. Accordingly, it is desirable to develop improved mechanisms and processes relating to applying visual feature tags to representations of objects.

OVERVIEW

Provided are various mechanisms and processes relating to performing feature identification and tagging using multi-view interactive digital media representations.

In one aspect, which may include at least a portion of the subject matter of any of the preceding and/or following examples and aspects, a process includes receiving via a communications interface a visual feature tagging request for a first a multi-view interactive digital media representation (MIDMR) of an object. The first MIDMR of the object includes spatial information, scale information, and a plurality of different viewpoint images of the object. The process also includes identifying via a processor a visual feature in the first MIDMR of the object, where the visual feature represents a physical location on the object. The visual feature appears in a first one of the viewpoint images at a first location and in a second one of the viewpoint images at a second location. The process also includes creating visual feature correspondence information that links information identifying the visual feature with the first location in the first viewpoint image and the second location in the second viewpoint image, as well as transmitting via the communications interface a feature tag message associated with the first MIDMR in response to the feature tagging request. The feature tag message identifies the visual feature in the first and second viewpoint images.

In another aspect, which may include at least a portion of the subject matter of any of the preceding and/or following examples and aspects, a system includes memory configured to store a visual feature tagging request for a first a multi-view interactive digital media representation (MIDMR) of an object. The first MIDMR of the object includes spatial information, scale information, and a plurality of different viewpoint images of the object. The system also includes a processor configured to identify a visual feature in the first MIDMR of the object, where the visual feature represents a physical location on the object. The visual feature appears in a first one of the viewpoint images at a first location and in a second one of the viewpoint images at a second location. The processor is also operable to create visual feature correspondence information that links information identifying the visual feature with the first location in the first viewpoint image and the second location in the second viewpoint image. The system also includes a communications interface configured to transmit a feature tag message associated with the first MIDMR in response to the feature tagging request. The feature tag message identifies the visual feature in the first and second viewpoint images.

In yet another aspect, which may include at least a portion of the subject matter of any of the preceding and/or following examples and aspects, a non-transitory computer readable media has instructions stored thereon for performing a process that includes receiving via a communications interface a visual feature tagging request for a first a multi-view interactive digital media representation (MIDMR) of an object. The first MIDMR of the object includes spatial information, scale information, and a plurality of different viewpoint images of the object. The process also includes identifying via a processor a visual feature in the first MIDMR of the object, where the visual feature represents a physical location on the object. The visual feature appears in a first one of the viewpoint images at a first location and in a second one of the viewpoint images at a second location. The process also includes creating visual feature correspondence information that links information identifying the visual feature with the first location in the first viewpoint image and the second location in the second viewpoint image, as well as transmitting via the communications interface a feature tag message associated with the first MIDMR in response to the feature tagging request. The feature tag message identifies the visual feature in the first and second viewpoint images.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION

Figure 1:
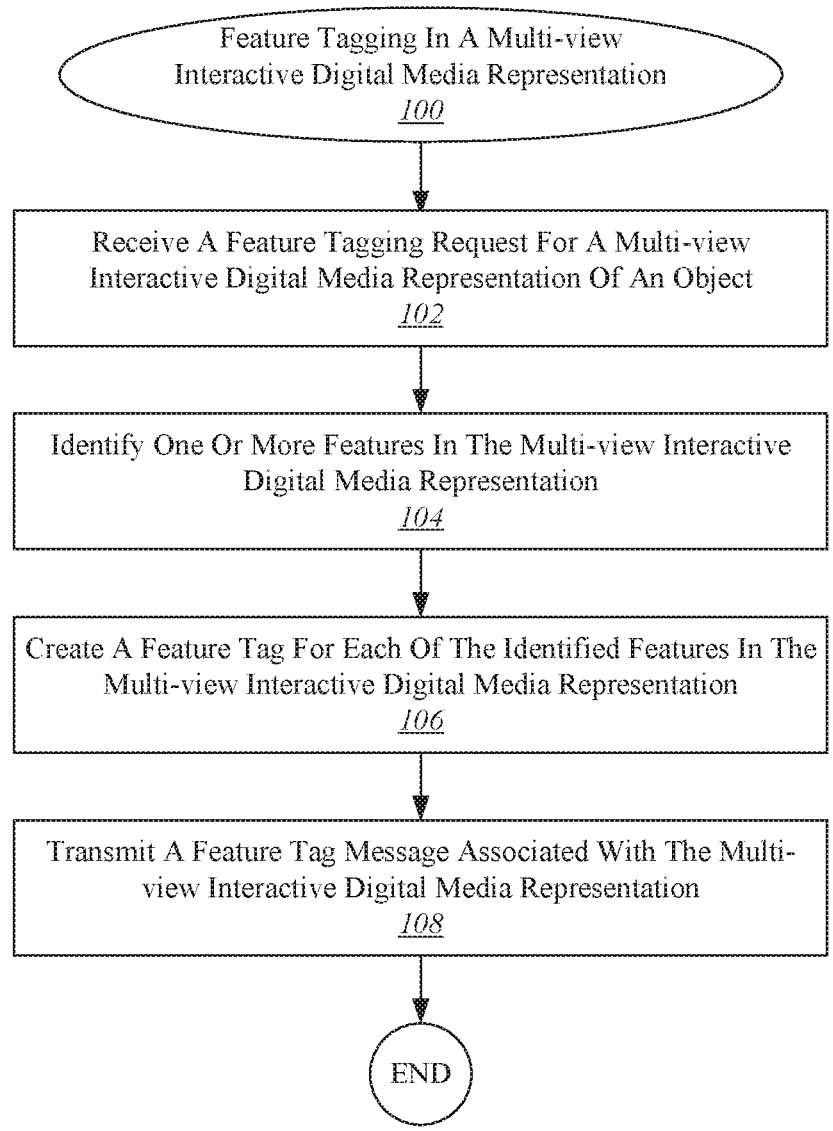
FIG. 1 illustrates an example of a process for performing feature tagging in a multi-view interactive digital media representation.

Reference will now be made in detail to some specific examples of the present disclosure including the best modes contemplated by the inventors for carrying out various embodiments of the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

According to various embodiments, improved mechanisms and processes are described for facilitating visual feature tagging using a multi-view interactive digital media representation (MIDMR). Each visual feature represents a physical part of an object that is depicted via an MIDMR. Such improved mechanisms and processes allow a user to navigate an MIDMR and view the same visual feature from different perspectives. In particular embodiments, visual features tags can be created in part based on user input that identifies one or more portions of an image or images associated with a feature. In some examples, visual feature tags can be created in part based on applying machine learning techniques to automatically detect features in MIDMRs.

According to various embodiments, a tag identifies a location associated with a feature in an MIDMR. A tag may also provide other information associated with the feature. For example, a tag may include any or all of one or more words, images, URIs cross-references, or other identifying marks. As another example, a tag may include a sub-MIDMR that focuses more specifically on the identified feature.

The mechanisms and processes described in this disclosure provide improvements over previous feature tagging capabilities that apply image tags to single images. However, the usefulness of an image tag in a single image is limited by the information available in that single image. Although visual feature tagging in individual images provides information about a portion of an image, such tagging does not allow the feature to be viewed from different perspectives and therefore provides limited information about the feature. By tagging visual features in an MIDMR, as described in various embodiments herein, significantly better and more relevant information is available for a viewer.

With reference to FIG. 1, shown is an example of a procedure 100 for feature tagging in an MIDMR. According to various embodiments, the method 100 may be used to identify a keyword, term, or other classifier associated with a particular feature within an MIDMR. For example, an MIDMR may be created that captures an object such as a vehicle. Then, feature tagging may be used to identify a keyword, term, or other classifier associated with features of the vehicle such as a bumper, door handle, license plate, or windshield. The keyword, term, or other classifier may then be associated with the MIDMR in the form of metadata such that the keyword, term, or other classifier may be shown in association with the feature when the MIDMR is presented on a display device.

At 102, a feature tagging request for the MIDMR may be received. According to various embodiments, the feature tagging request may be generated based on user input. For instance, a user at a mobile device, personal computer, or other computing device may provide user input requesting to tag features in an MIDMR. Alternately, or additionally, the feature tagging request may be automatically generated. For instance, when an MIDMR is generated, a computing device such as a server may automatically generate a request to tag features in the MIDMR. Feature tagging may then be performed automatically at the computing device or may be performed in conjunction with user input.

Next, at 104, one or more features in the MIDMR may be identified. According to various embodiments, various techniques may be used to identify features. For example, a user may provide user input to identify features by pointing to or clicking on an area of an image in an MIDMR associated with a particular feature in one or more images. Alternately, or additionally, a user may type a text label or keyword that identifies a particular feature in an MIDMR.

In particular embodiments, identifying a feature in an MIDMR may involve performing feature tracking across different images. For instance, an MIDMR may include different images of the same object taken from different viewpoints or at different points in time. In this case, identifying a feature may involve tracking characteristics of an object across these different images. For instance, image characteristics such as corners, planes, lines, human facial features, human joints, vehicle parts, or other such characteristics may be identified in one image and then tracked to a different image to create a correspondence that identifies the same feature in different images.

Figure 9:
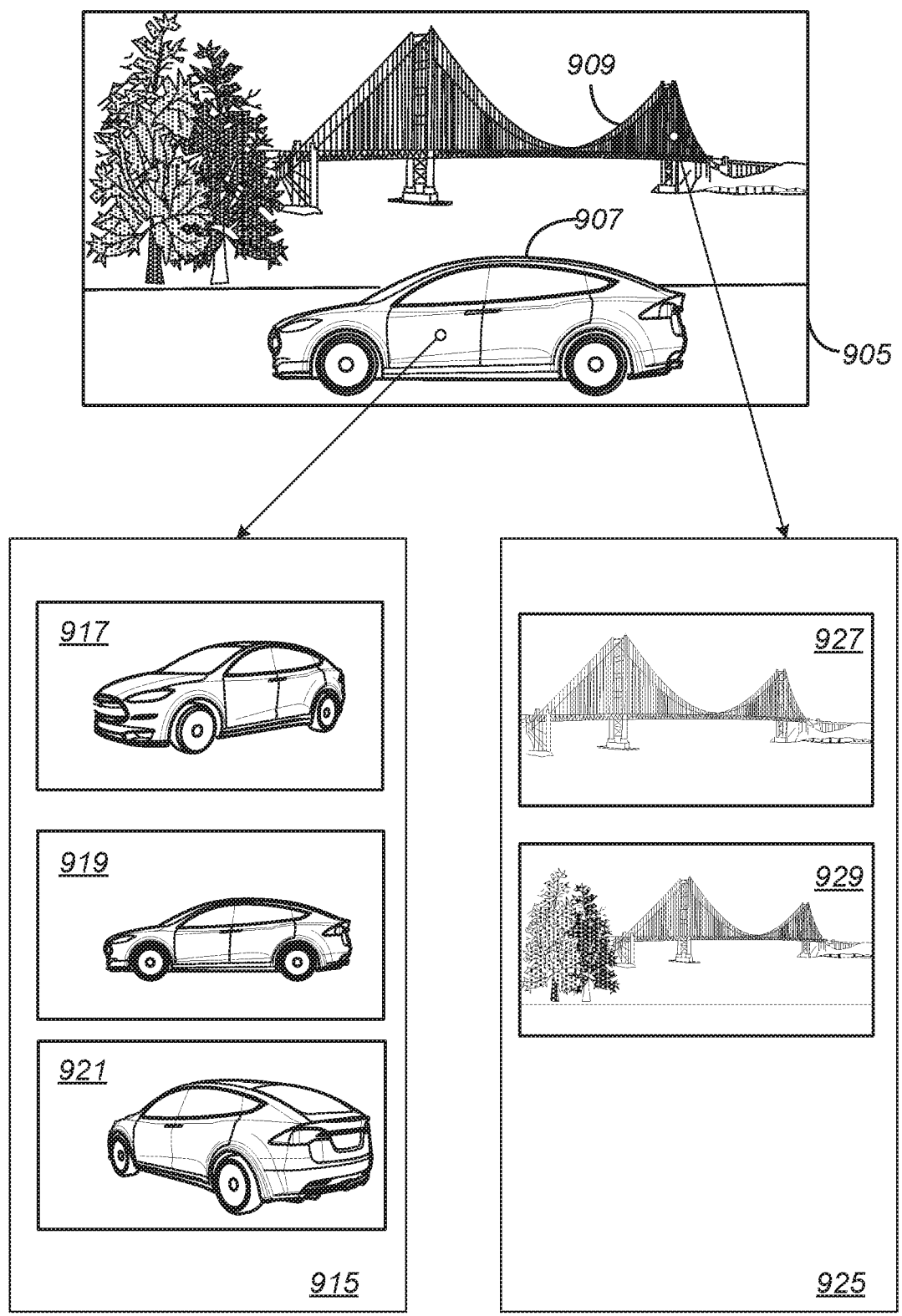
FIG. 9 illustrates an example of a scene from a multi-view interactive digital media representation that is presented to a user as a prompt for the user to select an area of focus for adaptive feature tagging.

In some implementations, identifying a feature in an MIDMR may involve performing object separation. Object separation may involve separating an MIDMR or image included in an MIDMR into different objects. For instance, if an MIDMR captures a vehicle in the foreground with a bridge in the background, the MIDMR may be analyzed to separate the two objects for the purpose of feature tagging. An example of such a configuration is shown in FIG. 9.

In some embodiments, identifying a feature in an MIDMR may involve performing object recognition. Object recognition may involve analyzing an object to determine its features based on, for instance, a reference image or MIDMR. For example, a reference image or MIDMR of a vehicle may identify features such as a license plate, door handle, or bumper. Then, a focal MIDMR may be compared with the reference image or MIDMR to identify features in the focal MIDMR that correspond with those explicitly identified in the reference image or MIDMR.

According to various embodiments, identifying a feature in an MIDMR may involve performing a visual search. For instance, a focal MIDMR may be used to search for static images, MIDMRs, or other visual media similar to the reference MIDMR. Then, the search results may be used to facilitate feature tagging. For instance, a focal MIDMR of a vehicle may be used to search for visual media capturing similar vehicles. The visual media included in the search results may be associated with tags identifying features in the visual media. These tags may then be used to identify corresponding features in the focal MIDMR.

In some implementations, a feature may be identified in part via adaptive search. In adaptive search, the computing device at which feature tagging is being performed may transmit a message to a user to provide additional information, such as additional images, to facilitate feature tagging. Additional discussion of techniques and mechanisms associated with adaptive feature tagging is provided with respect to FIG. 5.

In some implementations, a feature may be identified based in part on viewpoint recognition. For instance, an MIDMR may be associated with images captured from different viewpoints. Information indicating the direction, location, or perspective associated with a particular image may facilitate viewpoint recognition. For example, if a designated image in an MIDMR of a vehicle is known to be captured from the frontal perspective, then features associated with the front of a vehicle such as the windshield or windshield wipers may be identified. As another example, if an MIDMR is captured from a designated geographic location and includes an image captured while facing in a particular direction, then geographic information may be used to identify characteristics of an object likely to be captured in the MIDMR, such as a bridge or other landmark.

In some implementations, social information may be used to facilitate tagging. For instance, a user may be linked with other users via social media. Then, features tagged in media by the user's connections may be used to facilitate the tagging of similar features in the user's MIDMRs.

After identifying one or more features, at 106, a feature tag is created for each of the identified features in the MIDMR. In some implementations, creating a feature tag may involve constructing metadata identifying information associated with the feature. For example, the feature tag may identify a location in one or more images in an MIDMR associated with an identified feature. As another example, the feature tag may identify a label, term, keyword, URI, tag type, tag color, or other such characteristic associated with the identified feature. Once created, the feature tag includes sufficient information for providing a visual display in association with an MIDMR that both identifies the location of a visual feature across a plurality of images as well as metadata characterizing the visual feature.

In particular embodiments, the feature tag information may be drawn from any suitable source. For example, location, label, term, keyword, URI, tag type, tag color, or other such information may be provided by a user, may be determined based on object recognition algorithms, or may be identified based on a visual search.

Finally, at 108, a feature tag message associated with the MIDMR is transmitted. The feature tag message may include any information necessary for associating the created feature tag or tags with the MIDMR. For instance, the feature tag message may include any of the information identified at operation 106 as well as any other information associated with the MIDMR.

According to various embodiments, the feature tag message may be transmitted to any suitable recipient. For example, the feature tag message may be transmitted from a server at which feature tagging is performed to a client device so that the identified feature tag may be presented on a display screen at the client device. As another example, the feature tag message may be transmitted to a local or network storage device for the purpose of storing a tagged version of the MIDMR. As yet another example, the feature tag message may be transmitted directly to a local display screen for the purpose of displaying the tagged MIDMR.

Figure 2:
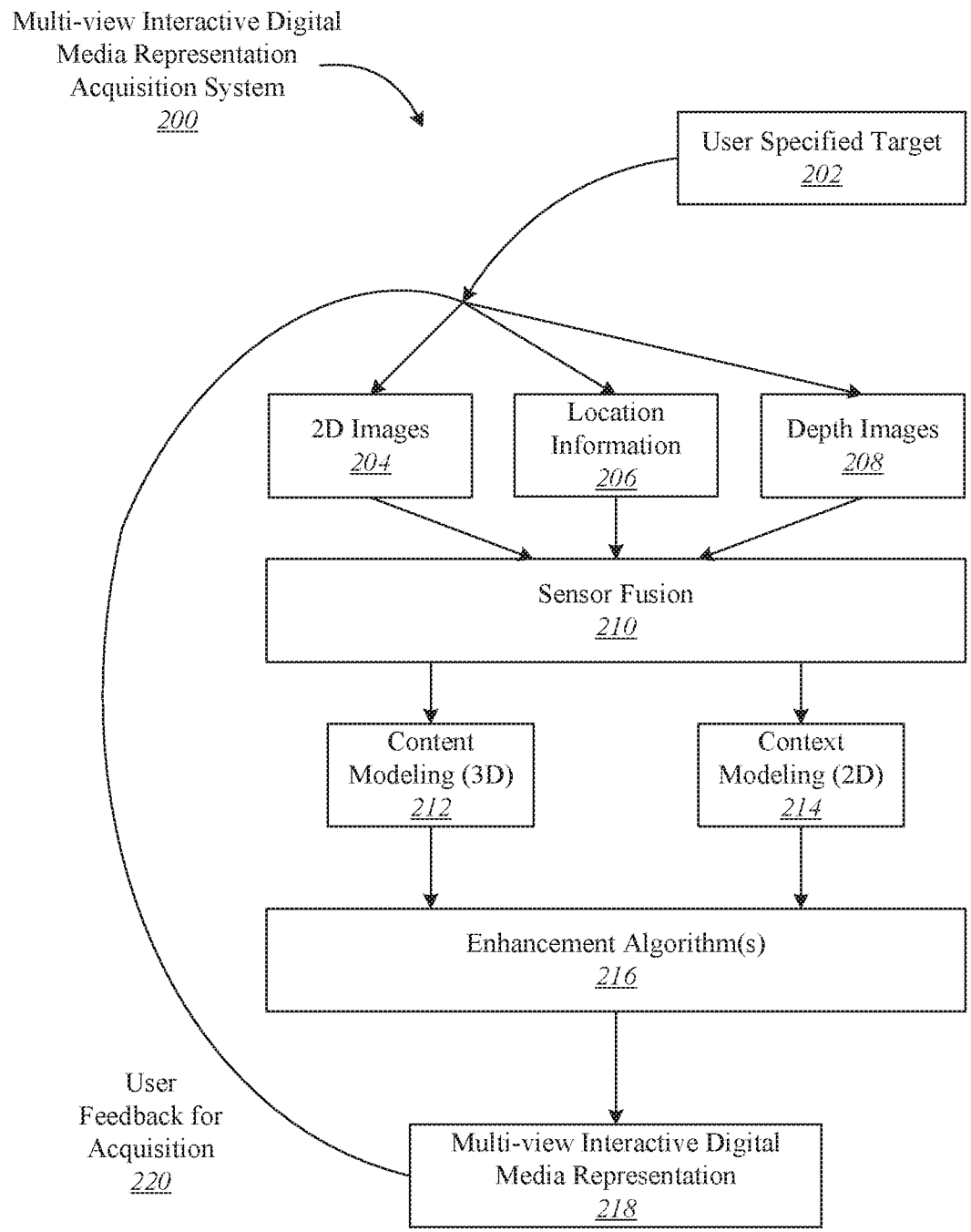
FIG. 2 illustrates an example of a multi-view interactive digital media representation acquisition system.

With reference to FIG. 2, shown is an example of an MIDMR acquisition system that can be used to generate an MIDMR, that can be used for feature tagging. An MIDMR includes much more information than a single image. Whereas a single image may include information such as a grid of color pixels and the date/time of capture, an MIDMR includes information such as such as grids of color pixels, date/time of capture, spatial information (flow/3D), location, and inertial measurement unit information (IMU) (i.e., compass, gravity, orientation). An MIDMR brings focus to an object of interest because it provides separation between the foreground and background. In addition, an MIDMR provides more information about the scale, context, and shape of the object of interest. Furthermore, by providing multiple views, aspects of the object that are not visible from a single view can be provided in an MIDMR.

In some approaches, multiple images of a single object are captured. However, MIDMRs represent a significant technological improvement relative to surround views. For example, the inertial measurement unit (IMU) compensation factors reflected in an MIDMR allow for imperfect capture arc trajectories.

In the present example embodiment, the MIDMR acquisition system 200 is depicted in a flow sequence that can be used to generate an MIDMR. According to various embodiments, the data used to generate an MIDMR can come from a variety of sources. In particular, data such as, but not limited to two-dimensional (2D) images 204 can be used to generate an MIDMR. These 2D images can include color image data streams such as multiple image sequences, video data, etc., or multiple images in any of various formats for images, depending on the application. Another source of data that can be used to generate an MIDMR includes location information 206. This location information 206 can be obtained from sources such as accelerometers, gyroscopes, magnetometers, GPS, Wi-Fi, IMU-like systems (Inertial Measurement Unit systems), and the like. Yet another source of data that can be used to generate an MIDMR can include depth images 208. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 210. In some embodiments, an MIDMR can be generated using a combination of data that includes both 2D images 204 and location information 206, without any depth images 208 provided. In other embodiments, depth images 208 and location information 206 can be used together at sensor fusion block 210. Various combinations of image data can be used with location information at 206, depending on the application and available data.

In the present example embodiment, the data that has been fused together at sensor fusion block 210 is then used for content modeling 212 and context modeling 214. During this process, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 212 and context modeling 214 can be generated by combining the image and location information data.

According to various embodiments, context and content of an MIDMR are determined based on a specified object of interest. In some examples, an object of interest is automatically chosen based on processing of the image and location information data. For instance, if a dominant object is detected in a series of images, this object can be selected as the content. In other examples, a user specified target 202 can be chosen. It should be noted, however, that an MIDMR can be generated without a user specified target in some applications.

In the present example embodiment, one or more enhancement algorithms can be applied at enhancement algorithm(s) block 216. In particular example embodiments, various algorithms can be employed during capture of MIDMR data, regardless of the type of capture mode employed. These algorithms can be used to enhance the user experience. For instance, automatic frame selection, stabilization, view interpolation, filters, and/or compression can be used during capture of MIDMR data. In some examples, these enhancement algorithms can be applied to image data after acquisition of the data. In other examples, these enhancement algorithms can be applied to image data during capture of MIDMR data.

According to particular example embodiments, automatic frame selection can be used to create a more enjoyable MIDMR. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for an MIDMR in a manner similar to that used for video. In particular, key frames in an MIDMR can be stabilized to produce improvements such as smoother transitions, improved/enhanced focus on the content, etc. However, unlike video, there are many additional sources of stabilization for an MIDMR, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for an MIDMR. Because points of interest in an MIDMR are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for MIDMRs. For instance, key points can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because an MIDMR is often focused on a particular object of interest, an MIDMR can be content-weighted so that the object of interest is maximally stabilized in some examples.

Another way to improve stabilization in an MIDMR includes direct selection of a region of a screen. For instance, if a user taps to focus on a region of a screen, then records a convex MIDMR, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic key points.

According to various examples, view interpolation can be used to improve the viewing experience. In particular, to avoid sudden "jumps" between stabilized frames, synthetic, intermediate views can be rendered on the fly. This can be informed by content-weighted key point tracks and IMU information as described above, as well as by denser pixel-to-pixel matches. If depth information is available, fewer artifacts resulting from mismatched pixels may occur, thereby simplifying the process. As described above, view interpolation can be applied during capture of an MIDMR in some embodiments. In other embodiments, view interpolation can be applied during MIDMR generation.

In some examples, filters can also be used during capture or generation of an MIDMR to enhance the viewing experience. Just as many popular photo sharing services provide aesthetic filters that can be applied to static, two-dimensional images, aesthetic filters can similarly be applied to surround images. However, because an MIDMR representation is more expressive than a two-dimensional image, and three-dimensional information is available in an MIDMR, these filters can be extended to include effects that are ill-defined in two dimensional photos. For instance, in an MIDMR, motion blur can be added to the background (i.e. context) while the content remains crisp. In another example, a drop-shadow can be added to the object of interest in an MIDMR.

In various examples, compression can also be used as an enhancement algorithm 216. In particular, compression can be used to enhance user-experience by reducing data upload and download costs. Because MIDMRs use spatial information, far less data can be sent for an MIDMR than a typical video, while maintaining desired qualities of the MIDMR. Specifically, the IMU, key point tracks, and user input, combined with the view interpolation described above, can all reduce the amount of data that must be transferred to and from a device during upload or download of an MIDMR. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, an MIDMR 218 is generated after any enhancement algorithms are applied. In various examples, the MIDMR can include a three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, MIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MIDMRs that allow the MIDMRs to be indexed with a high degree of efficiency and accuracy; and the ability of the user to interact and change the viewpoint of the MIDMR. In particular example embodiments, the characteristics described above can be incorporated natively in the MIDMR representation, and provide the capability for use in various applications. For instance, features appearing in MIDMRs can be identified and tagged.

According to various example embodiments, once an MIDMR 218 is generated, user feedback for acquisition 220 of additional image data can be provided. In particular, if an MIDMR is determined to need additional views to provide a more accurate model of the content or context, a user may be prompted to provide additional views. Once these additional views are received by the MIDMR acquisition system 200, these additional views can be processed by the system 200 and incorporated into the MIDMR.

Navigational inputs from an input device can be used to select which images to output in a MIDMR. For example, a user can tilt a mobile device or swipe a touch screen display to select the images to output in a MIDMR. The navigational inputs change the apparent position of the object included in a MIDMR on the display. For example, the object can appear to rotate on the display in response to the navigational inputs.

The MIDMR approach differs from rendering an object from a full 3-D model. With a full 3-D model approach, the navigational inputs can be used to adjust the position of the 3-D model in 3-D model space. Then, the 3-D model can be re-rendered to a 2-D image each time its position changes in the 3-D model space in response to the navigational inputs. This 3-D model approach provides for more transitions because the movements of the object are not predetermined. However, the 3-D model approach is computationally expensive, especially as the complexity of the 3-D model increases. Further, it requires the generation of a 3-D model, which can be time consuming.

The MIDMR approach doesn't require the constant rendering of images from a 3-D model space to a 2-D image. Further, the MIDMR approach doesn't require the generation of a 3-D model. Thus, the MIDMR approach can represent apparent motions of an object in 3-D in a faster and more computational efficient manner.

In various embodiments, a MIDMR can include images with an object. When the MIDMR is output, the object can appear to have an apparent motion, such as an ability to rotate about one or more axes. For example, the MIDMR can include images of a person that when output make the person appear to rotate about an axis such that the person can be viewed from different angles. The apparent rotation is accomplished using 2-D images only and doesn't require a 3-D model of the object, such as 3-D model including a plurality of polygons and associated textures. Hence, the operations can be performed in a more computationally efficient manner, as a textured 3-D model of the object doesn't have to be generated, the position of the 3-D model of the object and its polygons in the 3-D space for each rotation doesn't have to be determined and, after the 3-D model of the object is positioned in the 3-D space, it doesn't have to be textured and then rendered to a 2-D image for output to a display. The elimination of these steps with a MIDMR approach significantly reduces memory requirements and CPU requirements as compared to a traditional 3-D modeling approach.

In addition, when an apparent motion of an object is output from a MIDMR, it appears as if the object motion is generated from an image quality 3-D textured model. Image quality 3-D textured models are generated in a time consuming and often manual process. In particular, the generation of an image quality textured 3-D model of an object, such as an actual person, is quite difficult and time consuming, especially, when a "life like" rendering of the object is desired.

In the MIDMR approach, because of the elimination of the 3-D modeling steps, user-selected objects from user generated 2-D images can be converted quickly to a MIDMR and then output to a display in real-time. During output, the user can control aspects of apparent motion of the object within the MIDMR. Because the object in the MIDMR can be generated from real images, such as images received from a user controlled camera, the object appears life-like when output. In a traditional 3-D modeling approach, because of the difficulties associated with generating an image quality 3-D model, this capability is not offered.

Figure 3:
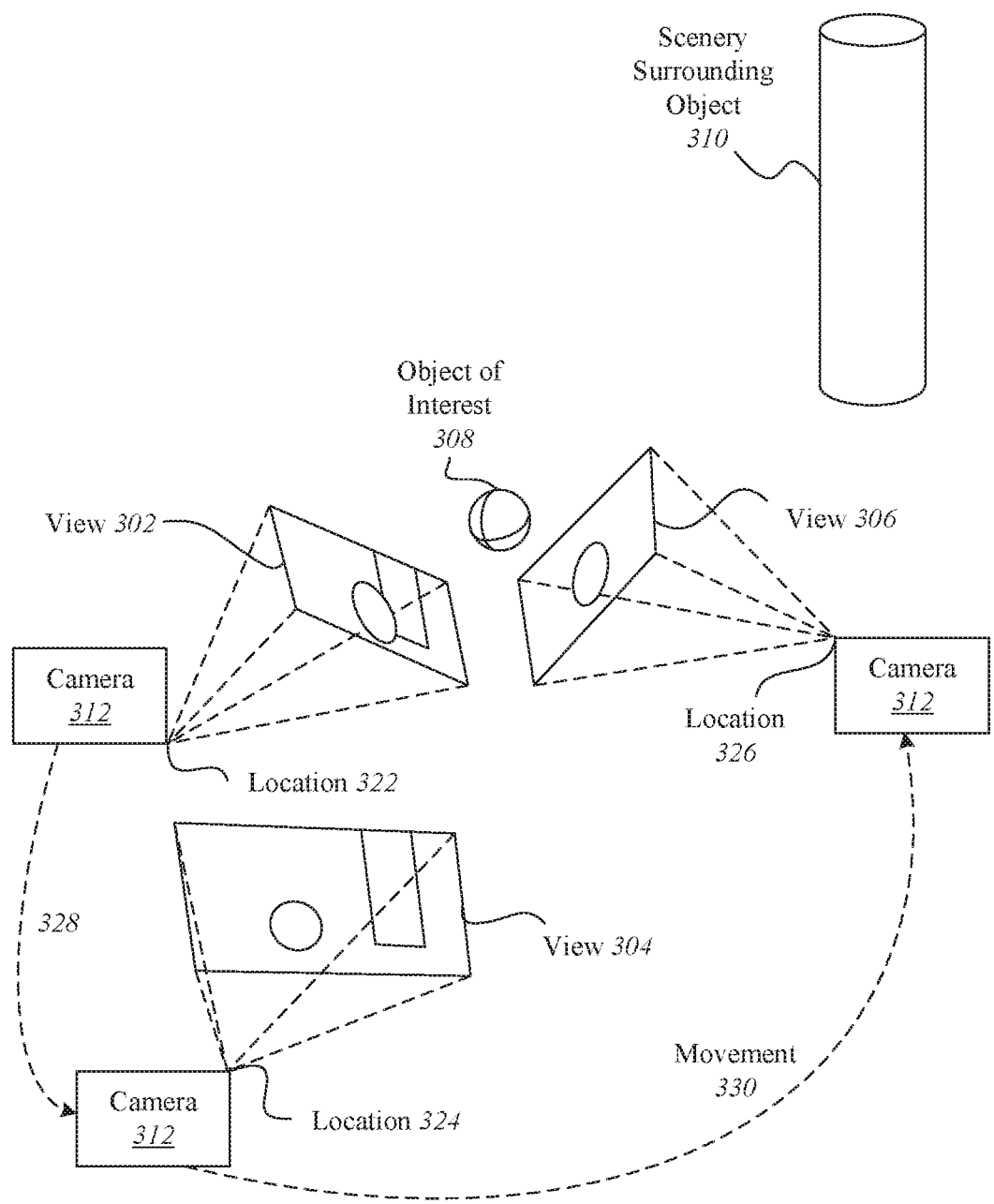
FIG. 3 illustrates an example of a device capturing multiple views of an object of interest from different locations for a multi-view interactive digital media representation.

With reference to FIG. 3, shown is an example of a device capturing multiple views of an object of interest from different locations for an MIDMR. The capture device is indicated as camera 312, and moves from location 322 to location 324 and from location 324 to location 326. The multiple camera views 302, 304, and 306 captured by camera 311 can then be fused together. According to various embodiments, multiple images can be captured from various viewpoints and fused together to provide an MIDMR.

In the present example embodiment, camera 312 moves to locations 322, 324, and 326, respectively, along paths 328 and 330, in proximity to an object of interest 308. Scenery can surround the object of interest 308 such as object 310. Views 302, 304, and 306 are captured by camera 312 from locations 322, 324, and 326 and include overlapping subject matter. Specifically, each view 302, 304, and 306 includes the object of interest 308 and varying degrees of visibility of the scenery surrounding the object 310. For instance, view 302 includes a view of the object of interest 308 in front of the cylinder that is part of the scenery surrounding the object 308. View 304 shows the object of interest 308 to one side of the cylinder, and view 306 shows the object of interest without any view of the cylinder.

In the present example embodiment, the various views 302, 304, and 306 along with their associated locations 322, 324, and 326, respectively, provide a rich source of information about object of interest 308 and the surrounding context that can be used to produce an MIDMR. For instance, when analyzed together, the various views 302, 304, and 306 provide information about different sides of the object of interest and the relationship between the object of interest and the scenery. These views also provide information about the relative size and scale of the object of interest in relation to the scenery. Furthermore, views from different sides of the object provide information about the shape and texture of the object. According to various embodiments, this information can be used to parse out the object of interest 308 into content and the scenery 310 as the context. In particular examples, the features included in the content can then be identified and tagged.

Figure 4:
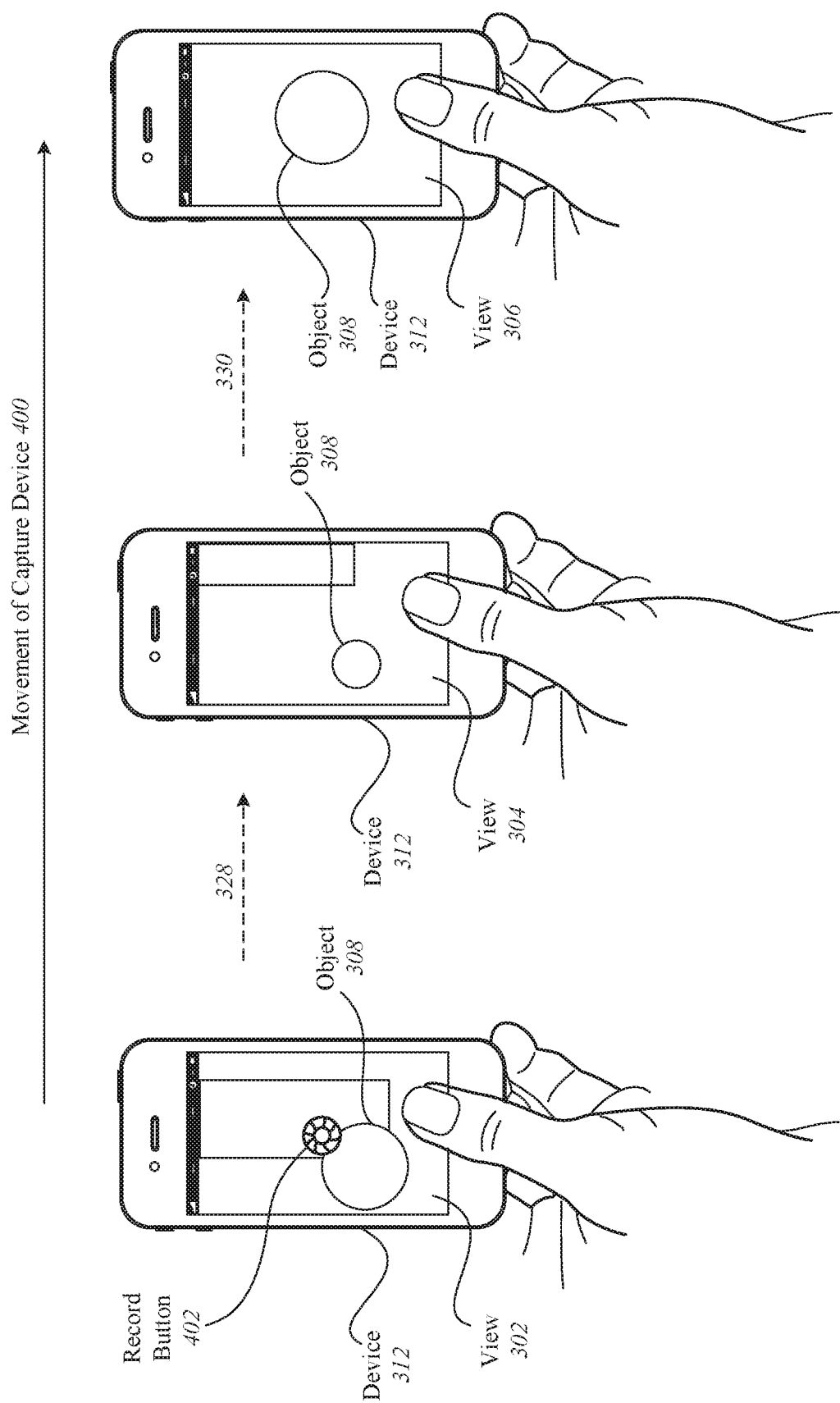
FIG. 4 illustrates an example of a device capturing views of an object of interest for a multi-view interactive digital media representation.

With reference to FIG. 4, shown is an example of a device capturing views of an object of interest for an MIDMR. In particular, this device can be used during a live session or to create a stored MIDMR. During a live session, the views are captured by the device during the feature tagging session. In some examples, additional views can be added by moving the capture device during the feature tagging process. For a stored MIDMR, the views are captured before the feature tagging process begins.

During a capture session, multiple views of the object 308 are captured by the device 312 from different locations. In the present example, data is acquired when a user taps a record button 402 on capture device 312 to begin recording images of the object 308. The user moves 300 the capture device 312 from location 322 to location 324 along path 328 and from location 324 to location 326 along path 330. In some examples, prompts for the user to capture particular views can be provided during the session in order to improve the accuracy of the MIDMR. In particular, the system can prompt the user to move the device 312 in a particular direction or may prompt the user to provide additional information. Once the user has finished capturing images of the object for the MIDMR, the user may choose to stop recording by tapping the record button 402 again. In other examples, the user can tap and hold the record button during the session, and release to stop recording. In the present example, the recording captures a series of images that can be used to generate an MIDMR that can be used for feature identification and tagging.

Figure 5:
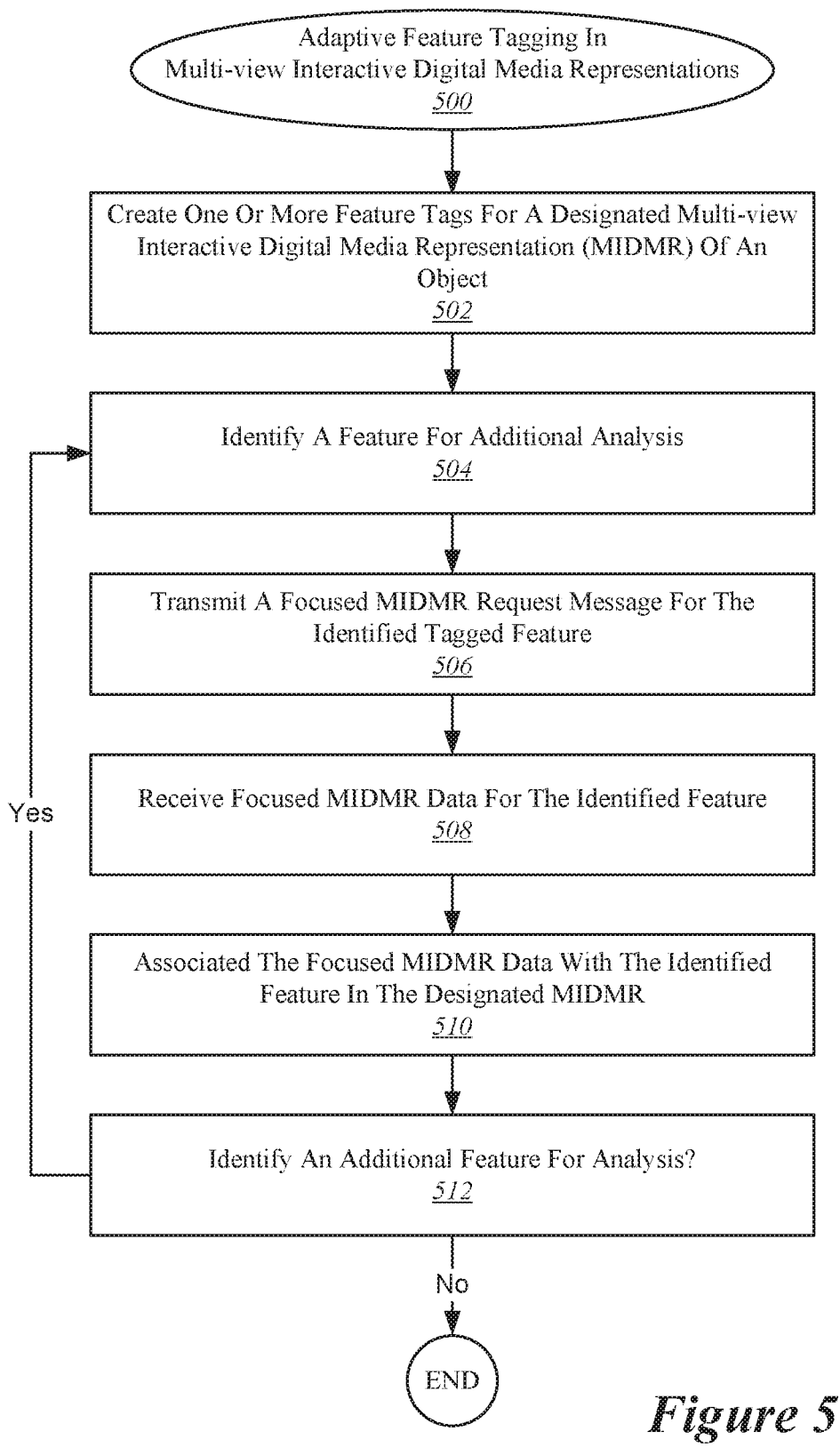
FIG. 5 illustrates an example of a process for performing adaptive feature tagging in a multi-view interactive digital media representation.

With reference to FIG. 5, shown is an example of a method 500 for performing adaptive feature tagging in an MIDMR. As discussed with respect to operation 104 shown in FIG. 1, adaptive feature tagging may be used to collective additional information to facilitate the feature tagging process.

First, at 502, one or more feature tags for an MIDMR are optionally created. Techniques for creating one or more feature tags are discussed throughout this application, and in particular with respect to FIG. 1.

Next, at 504, one or more features are identified for additional analysis. According to various embodiments, a feature identified for additional analysis may be a feature that has been tagged, for instance at operation 502. Alternately, a feature identified for additional analysis may not yet be associated with a tag. For example, a feature of an MIDMR may be identified as having the potential of being assigned a tag and then may be identified for additional analysis to determine whether to apply a tag. As another example, an area of an MIDMR may be designated for analysis for the purpose of identifying more than one feature within the area.

In particular embodiments, a user may select a feature for additional analysis. Alternately, or additionally, an algorithm may designate a feature for additional analysis. For example, a user may perform feature tagging for an MIDMR of a vehicle, for instance in preparation for selling the vehicle. Then, either the user or a computing system may identify a particular area of the vehicle for further analysis. The identified area may be a part of the vehicle that is scratched or damaged, an area of particular importance or interest such as a dashboard or vehicle identification number (VIN) designator, or a unique feature such as an aftermarket modification to the vehicle.

In some implementations, a computing system may identify a feature for additional analysis via any of various techniques. For example, the computing system may identify a type of object represented in the MIDMR, such as a vehicle. Then, the computing system may identify areas of interest for that type of object based on, for instance, a reference MIDMR that flags particular areas of interest for adaptive tagging. As another example, the computing system may compare a focal MIDMR with a reference MIDMR to identify features that are different between the focal MIDMR, which may then be identified for adaptive analysis. As yet another example, the computing system may identify areas of the object (e.g., a vehicle) that are damaged. Techniques for identifying damage are discussed in additional detail with respect to FIG. 6.

After identifying a feature for additional analysis, at 506 a focused MIDMR request message for the identified feature is transmitted. According to various embodiments, the focused MIDMR request message may be transmitted from a server to a client machine and/or from a client machine to a user interface. The focused MIDMR request message may include information identifying the feature selected for additional analysis. For instance, the focused MIDMR request message may identify a location of the selected feature. Alternately, or additionally, the focused MIDMR request message may provide textual information identifying the selected feature, such as text requesting additional data collection for the dashboard, bumper, running board, door handle, or windshield of a car.

Next, at 508 focused MIDMR data is received for the identified feature. In some implementations, the focused MIDMR data may include additional still images and/or video data captured of the identified feature. For instance, a user may response to the request message by using a mobile device such as a cell phone to capture additional images or video of the identified feature. Then, the mobile device may transmit one or more images or video to a local processor or remote server for analysis.

After receiving the focused MIDMR data, at 510 some or all of the focused MIDMR data is associated with the identified feature in the designated MIDMR. According to various embodiments, associating the focused MIDMR data with the identified feature may involve any or all of a variety of operations. For example, the focused MIDMR data may be used to determine whether or not to tag a feature in the designated MIDMR. As another example, one or more images or videos in the focused MIDMR data may be associated with a feature tag in the designated MIDMR. For instance, when a user mouses over or clicks on the feature tag, the one or more images or videos may be presented.

In particular embodiments, the focused MIDMR data may be used to construct a sub-MIDMR. The sub-MIDMR may act essentially as a full-featured MIDMR focused on the identified feature. However, the sub-MIDMR may be linked to the identified and/or tagged feature in the designated MIDMR. For instance, when the user clicks on or mouses over an associated tag in the designated MIDMR, the sub-MIDMR that focuses more specifically on the identified feature may be presented. In this way, the user may effectively "zoom in" on a feature of interest, such as a vehicle dashboard or scratched door panel. However, the "zoomed in" aspect of the MIDMR may itself be a sub-MIDMR that allows the user to view the feature of interest from different perspectives.

At 512, a determination is made as to whether to identify an additional feature for analysis. According to various embodiments, the determination may be made based on any of various considerations. In a first example, the user may provide input requesting to continue or terminate adaptive feature tagging for the designated MIDMR. In a second example, a computing device may determine that all relevant features associated with the designated MIDMR have been identified. In a third example, a computing device may determine that the designated MIDMR is "full" and lacks room for presenting additional features or sub-MIDMRs. In a fourth example, a computing device may determine that all damaged areas or areas of interest associated with the object presented in the designated MIDMR have been identified. The procedure may be terminated if no additional feature is selected for analysis.

Figure 6:
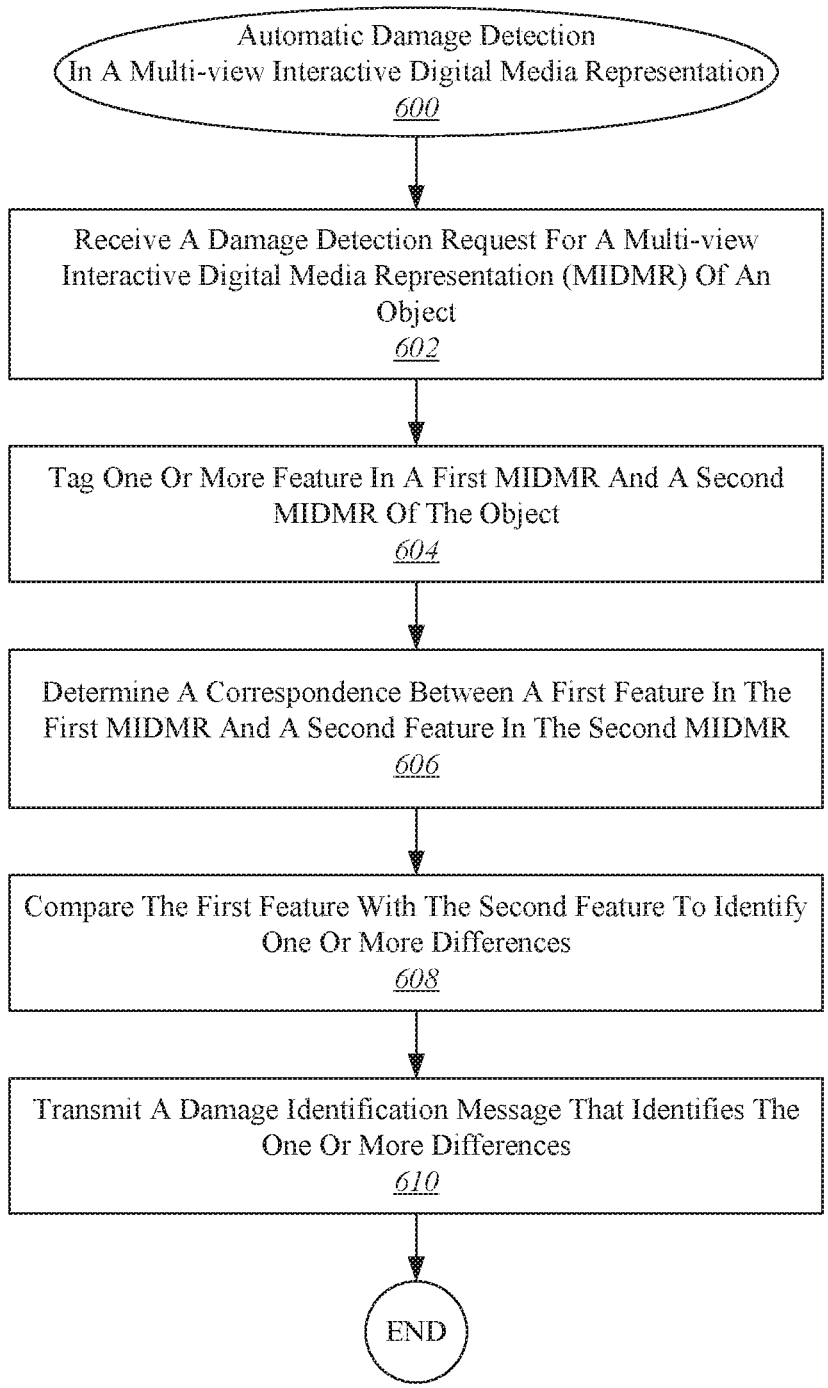
FIG. 6 illustrates an example of a process for performing automatic damage detection in a multi-view interactive digital media representation.

With reference to FIG. 6, shown is a method 600 for automatic damage detection in an MIDMR. The method 600 may be performed in conjunction with feature tagging to identify changes or defects in an object represented in an MIDMR. For example, the method 600 may be performed to identify damage to a vehicle.

At 602, a request to perform damage detection for an MIDMR is received. According to various embodiments, the request may be generated based on user input. For instance, a user may capture an MIDMR of an object such as a vehicle and then request to identify damage to that object. Alternately, or additionally, a request may be generated by a computing system. For example, a computing system may perform object recognition to identify the object of an MIDMR and then automatically generate a request to identify damage to that object.

In particular embodiments, a variety of objects may be the subject of damage detection. Such objects may include, but are not limited to: vehicles, furniture, building exteriors, building interiors, tools, persons, animals, paintings, sculptures, or any other object suitable for visual representation. In a first example, MIDMRs of the same or similar vehicles may be compared to identify damage to one or more parts of the vehicle. In a second example, different MIDMRs of the same building at different points in time may be compared to identify damage to the building over time. In a third example, an MIDMR of a person or animal or part of a person or animal may be compared with a reference MIDMR to identify an injury to the person or animal, for instance for triage or diagnostic purposes. In a fourth example, an MIDMR of a tool may be compared with a reference MIDMR to identify damage to the tool, for instance for the purposes of safety monitoring. In a fifth example, an MIDMR of artwork may be captured and then used as a reference MIDMR to determine at a later point if the artwork has been damaged.

Next, at 604, one or more features are tagged in a first MIDMR and a second MIDMR. In some instances, the two MIDMRs may be taken of exactly the same object, for instance at two different points in time. Alternately, the two MIDMR According to various embodiments, various types of techniques may be used for feature tagging. Examples of such techniques are discussed throughout this application, and in particular with reference to FIGS. 1 and 5. Further, although FIG. 6 is described with reference to a first and second MIDMR of an object, in some implementations more MIDMRs may be employed. For instance, a focal MIDMR may be compared with some number of reference MIDMRs to better identify damage to the focal MIDMR After tagging one or more features in both a first MIDMR and a second MIDMR, at 606 a correspondence between a first feature in the first MIDMR and a second feature in the second MIDMR is determined. According to various embodiments, the correspondence may be determined by any suitable technique. For example, a feature may reside at approximately the same location in the first and second MIDMRs, for instance if both MIDMRs include an image captured from corresponding viewpoints. As another example, visual characteristics such as corners, surfaces, or lines may be tracked or mapped between the two MIDMRs, and then these characteristics may be used to create a correspondence between a feature in one MIDMR with a feature in another MIDMR.

Then, at 608, the first feature in the first MIDMR is compared with the second feature in the second MIDMR to identify a difference. In some implementations, the two features may be compared via an object recognition or analysis procedure. For instance, the procedure may analyze images of the same feature in the first and second MIDMR to identify differences to shape, size, texture, color, or some other visual characteristic between the two MIDMRs.

Finally, at 610, a damage identification message that identifies the one or more differences is transmitted. According to various embodiments, the damage identification message may be transmitted to any suitable recipient, such as a local or network storage device, a client computing device, or a third party. For instance, the damage identification device may be transmitted to an insurance provider or vehicle rental service.

In some implementations, the damage identification message may include any or all information suitable for indicating the identified damage. For example, the damage identification message may include location information for the tag associated with the damage. As another example, the damage identification message may include identifying information such as words, URIs. or images associated with the tagged feature. As yet another example, the damage identification message may include some or all of the content included in the first or second MIDMR. As still another example, the damage identification message may include a request for additional information, such as via adaptive feature tagging as discussed with respect to FIG. 5.

In particular embodiments, the techniques discussed in reference to FIG. 6 may be used to identify changes other than damage. For instance, natural changes to the coloring or shape of artwork over time may be identified. As another example, natural changes to persons or animals as a result of aging may be identified. As yet another example, these techniques and mechanisms may be used to identify plant growth.

In particular embodiments, operations shown in FIG. 6 may be performed in an order different than that shown. For instance, in FIG. 6, differences between corresponding features are determined after features are tagged. However, differences between MIDMRs may also be used to identify features. For example, a first MIDMR of an object may be compared with a second MIDMR of the same or similar object to identify differences between the two objects. Then, those differences may be used to guide the selection of features for tagging. For instance, an area of a vehicle that appears scratched in one MIDMR but not scratched in another MIDMR may be identified as a feature, even if the area is otherwise unremarkable.

Figure 7:
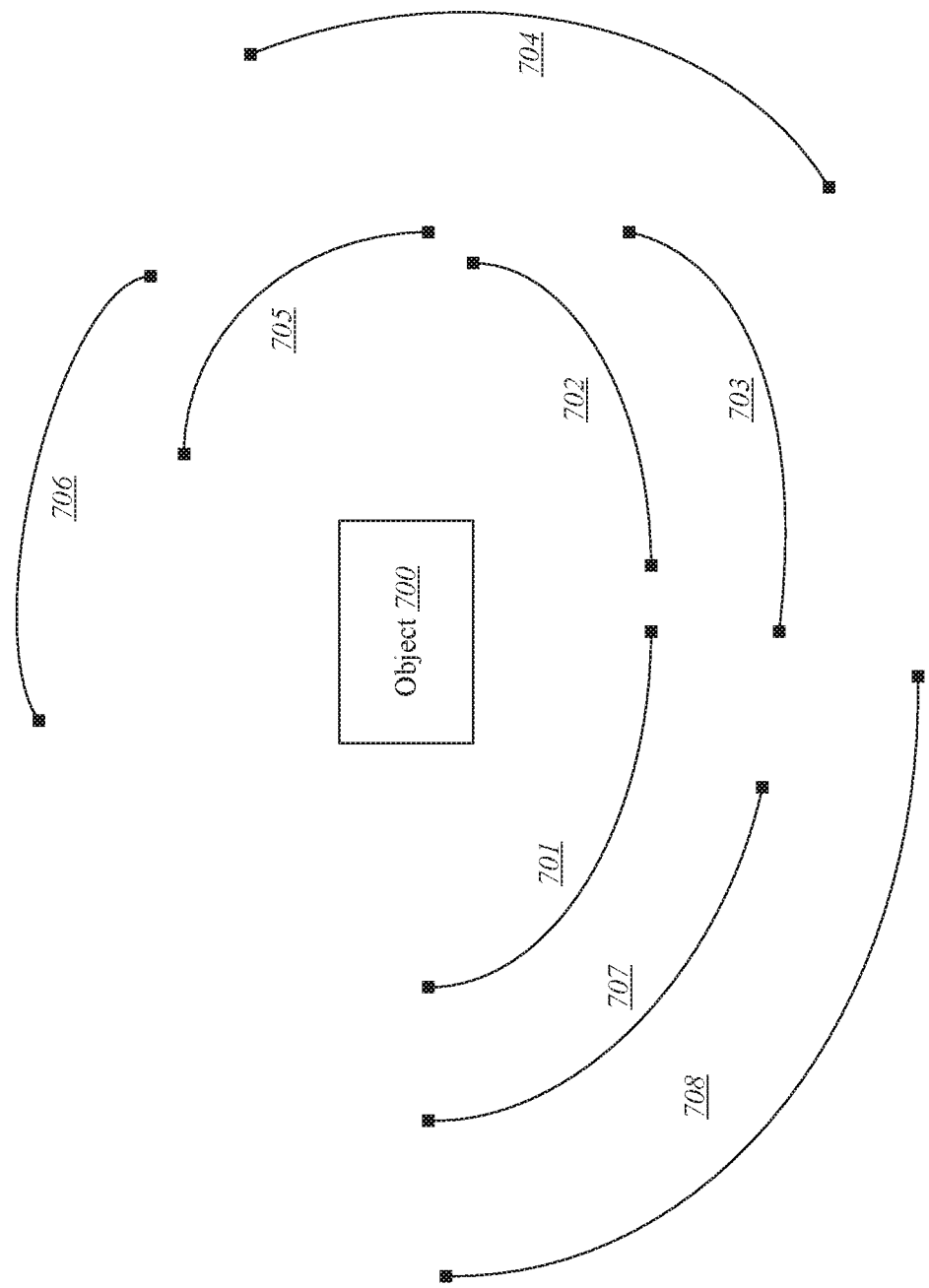
FIG. 7 is a diagrammatic representation showing an example of different recordings of the same or a similar object from different viewpoints.

With reference to FIG. 7, shown is a diagrammatic representation showing an example of different recordings of the same or a similar object from different viewpoints. As shown, recordings 1001, 1002, 1003, 1004, 1005, 1006, 1007, and 1008 capture images of object 1000 from different viewpoints. In a viewpoint-aware feature tagging, tags can be constructed based in part on the particular viewpoint in which a feature is presented. For example, feature tagging that includes features shown in viewpoint 701 would also create corresponding tags in viewpoints 707 and 708. As another example, feature tagging that includes features shown in viewpoint 701 might include suggestions of tags drawn from MIDMRs of similar objects with viewpoints similar to 701, 707, and 708.

Figure 8:
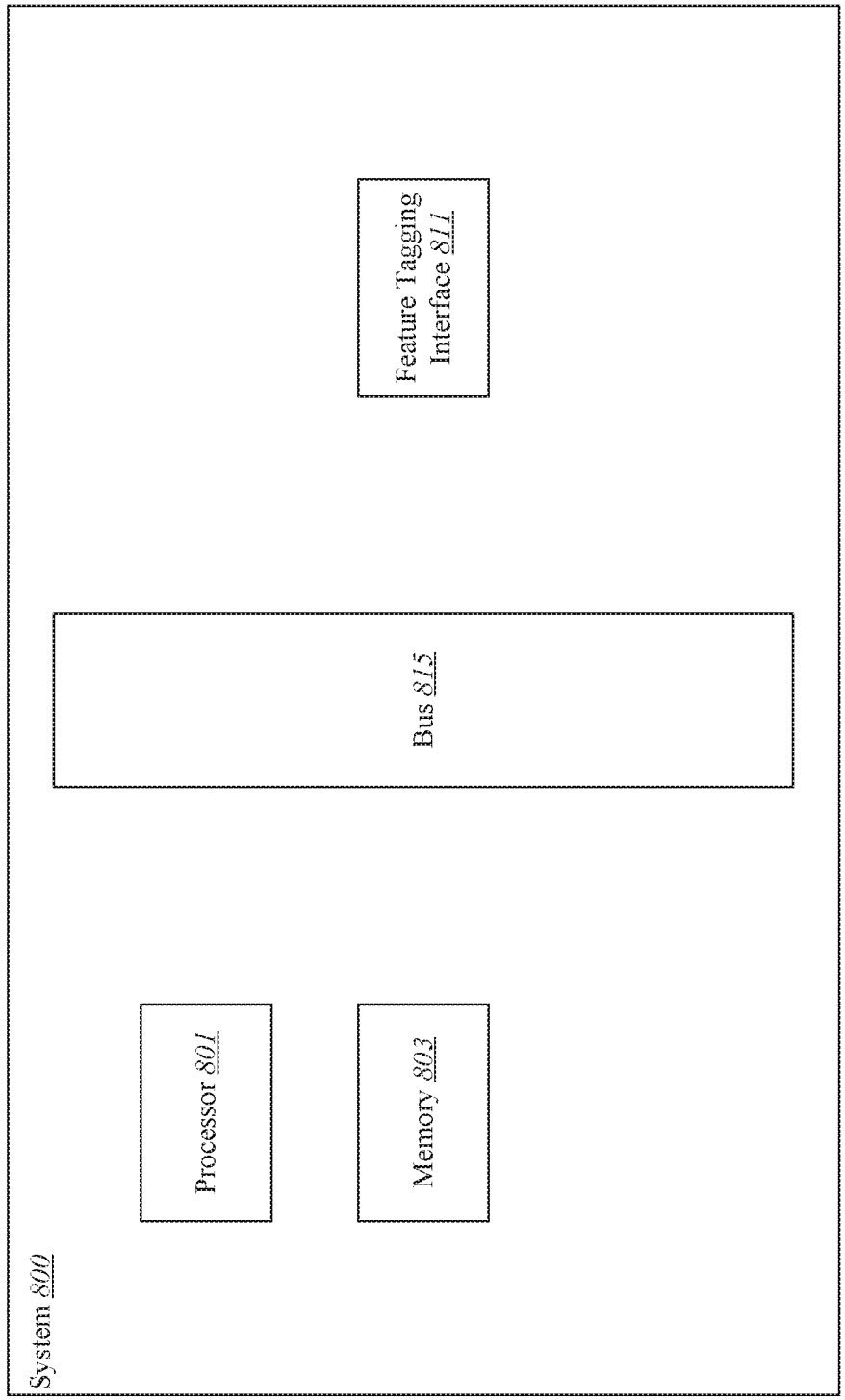
FIG. 8 illustrates a particular example of a computer system that can be used with various embodiments of the present invention.

With reference to FIG. 8, shown is a particular example of a computer system that can be used to implement particular examples of the present invention. For instance, the computer system 800 can be used to perform feature identification and tagging in visual representations, such as an MIDMRs, according to various embodiments described above. In particular example embodiments, a system 800 suitable for implementing particular embodiments of the present invention includes a processor 801, a memory 803, feature tagging interface 811, and a bus 815 (e.g., a PCI bus). The feature tagging interface 811 may include separate input and output interfaces, or may be a unified interface supporting both operations. When acting under the control of appropriate software or firmware, the processor 801 is responsible for such tasks such as optimization. Various specially configured devices can also be used in place of a processor 801 or in addition to processor 801. The complete implementation can also be done in custom hardware. The feature tagging 811 is typically configured to send and receive data packets or data segments over a network. Particular examples of interfaces the device supports include Ethernet interfaces, frame relay interfaces, cable interfaces. DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 800 uses memory 803 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

With reference to FIG. 9, shown is an example of a scene from an MIDMR that is presented to a user as a prompt for the user to select an area of focus in the scene for a selective feature tagging. As depicted, scene 905 shows a particular viewpoint of an MIDMR. Two preselected objects of interest are presented as vehicle 907 and bridge 909. According to various embodiments, the user can select one of these objects of interest as the subject of feature tagging. Search results 915 show thumbnail images of some of the possible search results 917, 919, and 921 for a search of the vehicle 907. Search results 925 show thumbnail images of some of the possible search results 927 and 929 of the bridge 909. In some examples, the user selects the object of interest by engaging a touch screen on a mobile device (such as by tapping the touch screen) or using a mouse on a personal computer. In addition, selections of specific areas of the scene can be made by designating a bounding box or other shape to indicate the area of focus. For instance, the user may circle a portion of the vehicle 907, such as the rims.

Then, feature tagging may be assisted by the identification of feature tags associated with the search results.

Figure 10:
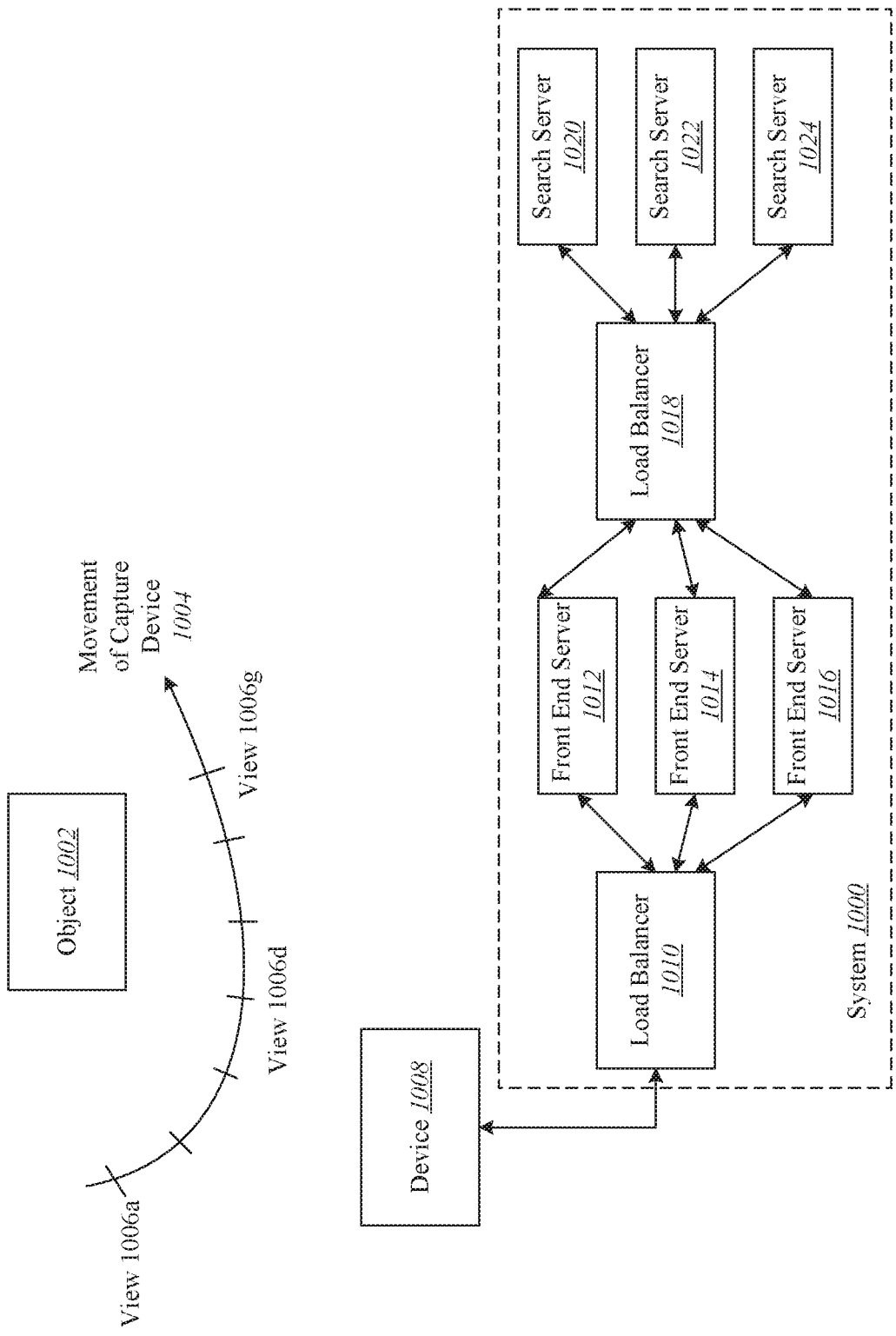
FIG. 10 illustrates one example of a system that can be used to perform feature tagging using multi-view interactive digital media representations.

With reference to FIG. 10, shown is one example of a system that can be used to perform feature tagging using MIDMRs. As depicted, a combination of client and server applications is used to implement a feature tagging mechanism that uses an MIDMR as a search query. In the present embodiment, the client is depicted as device 1008, which can be a capture device such as a digital camera, smartphone, mobile device, etc. In some examples, the device 1008 can be a computer or other electronic device that stores an MIDMR of an object to be searched. The server is depicted as system 1000, which receives an MIDMR that includes images of the object to be searched.

In the present embodiment, system 1000 generates actual or suggested feature tags based on the MIDMR by comparing an MIDMR received from device 1008 to MIDMRs and/or images stored by or accessible to system 1000. As shown, system 1000 includes load balancers 1010 and 1018, front end servers 1012, 1014, and 1016, and tagging servers 1020, 1022, and 1024. Depending on the particular implementation of the system 1000, front end servers 1012, 1014, and 1016 can be used for operations such as determining additional views and/or information that may be helpful in refining the search results, assigning feature tags, calculating correspondence measures and/or confidence values, and communicating with device 1008. The tagging servers 1020, 1022, 1024 can be used for operations such as those relating to searching for and retrieving search results and those relating to generating actual or suggested feature tags. Although system 1000 includes load balancers 1010 and 1018 to improve performance of the system and make the system scalable, these load balancers 1010 and 1018 are optional in some implementations.

According to various embodiments, device 1008 captures images of object 1002 to generate an MIDMR that can be used in a search query for the object. In particular, device 1008 follows a path depicted as movement of capture device 1004 while recording images of object 1002 from views 1006a to 1006g. The views 1006a to 1006g are captured as images or frames, along with additional information such as location information, spatial information, and scale information corresponding to each of these images or frames. Although device 1008 is depicted as being a capture device in the present example, it is also possible in other examples that device 1008 is a computing device that has access to a stored MIDMR that includes views of the object to be tagged.

In the present example, the session begins by initially sending an MIDMR from device 1008 to system 1000 as a visual search query. The MIDMR includes images (or frames) and other information associated with the images, such as data collected by sensors (e.g. IMU data. GPS location, audio etc.). The system 1000 performs a search by comparing the MIDMR to a set of stored MIDMRs associated with different items. In some embodiments, the MIDMR may also be compared to stored images or sets of images. In some cases, the system returns search results to the user with a unique identifier that allows the user to send more data along with the unique identifier, such that the additional data expands coverage of the MIDMR. If additional data is sent, system 1000 uses the additional data to improve the search results by combining the additional data with the previously received MIDMR. The system then performs a search again with the improved MIDMR as a visual search query.

The results of the visual search may then be used to assign actual or suggested feature tags. For instance, the visual search may identify search result MIDMRs similar to the reference MIDMR. Then, tags assigned in one or more of the search result MIDMRs may be used to determine actual or suggested feature tags for the reference MIDMR. For instance, a reference MIDMR of a vehicle may be used to search for MIDMRs of similar vehicles. The search result MIDMRs may have tags associated with particular features such as a license plate, door handle, or windshield. The location and content of those tags may then be used to determine actual or suggested feature tags for the reference MIDMR.

Various embodiments have been described in the present disclosure related to mechanisms and processes implementing feature tagging using MIDMRs or other multi-view interactive digital media. Feature tagging using MIDMRs in this manner provide numerous benefits and advantages over traditional feature tagging searching mechanisms and processes. In particular, one advantage is that MIDMRs highlight the object of interest because a user captures an MIDMR by keeping the object of interest in the field of view while capturing views of the object from different angles. Another advantage is that MIDMRs provide a separation of foreground and background, which provides information that is not available in single image feature tagging approaches. In particular, MIDMRs include multiple viewpoints that allow the scene to be divided into layers of different depths and objects to be separated from each other. A further advantage is that MIDMRs provide information about the scale of an object. Specifically, indicators such as IMU data, including acceleration, step counts, etc., can be used to estimate the scale of the object of interest. In contrast, traditional image-based feature tagging does not include IMU data, so the scale of an object cannot be estimated in traditional image-based feature tagging in this way.

Another advantage of using MIDMRs in feature tagging is that MIDMRs provide more context about the object of interest. In particular, although an MIDMR highlights the object of interest by featuring multiple viewpoints, an MIDMR also includes more information about the context or background available. This additional information about the context or background can be used by the system to further find and refine search results to be more relevant and thus to more accurately identify features.

Yet another advantage of using MIDMRs in feature tagging is that MIDMRs provide more information about the shape of an object of interest. Accordingly, a visual search can be used to find items with a similar shape but a different texture. For instance, a parameterized visual search using MIDMRs can be used to focus the search on matches with the same shape, regardless of texture or other attributes of the object. Then, features tagged in those search results may be used to determine or suggest features to tag in the reference MIDMR. In contrast, traditional image-based feature tagging does not allow for this type of specialized search because the single images used do not include 3D shape information.

Figure 11:
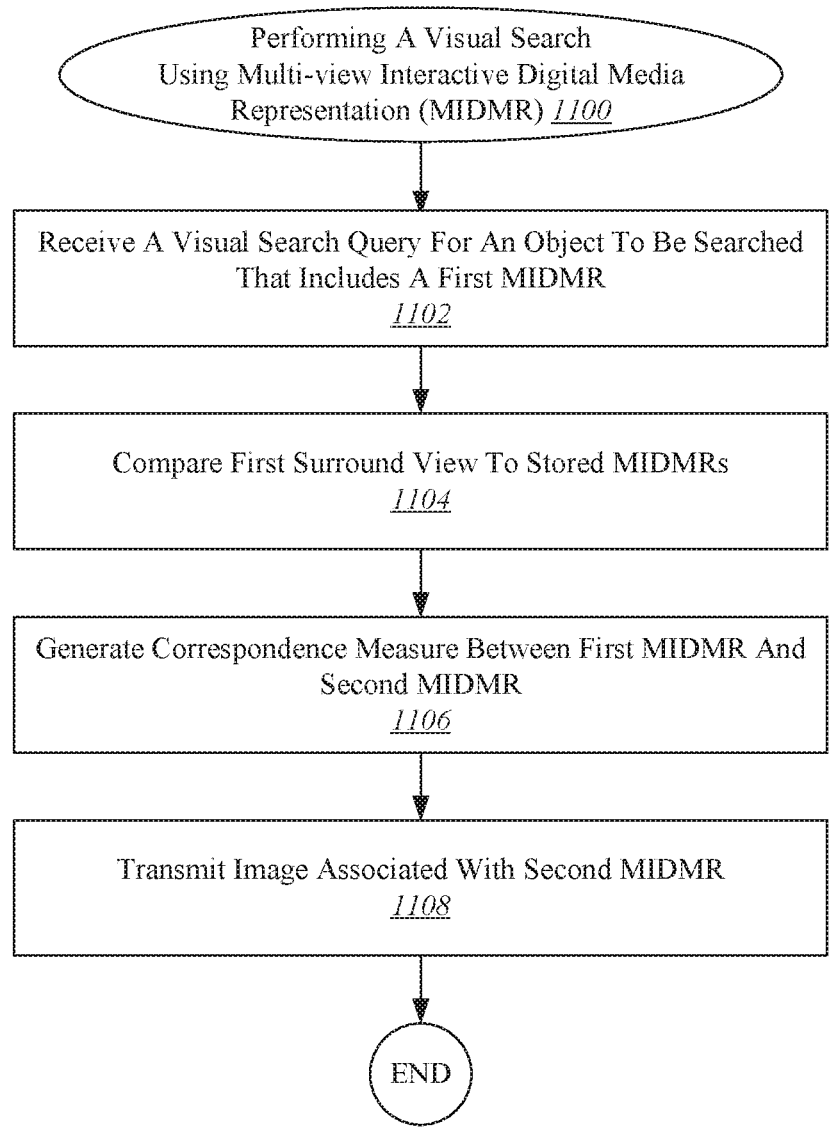
FIG. 11 illustrates one example of a process for performing visual search using a multi-view interactive digital media representation.

With reference to FIG. 11, shown is an example of a process for performing a visual search using MIDMRs. Using MIDMRs or other MIDMRs in visual search provides advantages over using a single image or a stationary video recording. In particular, whereas a single image is only a grid of color pixels and a video is a time sequence of grids of color pixels, an MIDMR is designed to include multiple viewpoints of the object of interest. Furthermore, in addition to pure visual information, which includes aspects such as color and texture, an MIDMR also stores aspects such as spatial information about the visual data (such as 3D location information for the visual information, depth information, or visual flow between different viewpoints), geo-location, date and time of capture, and IMU data (such as compass, gravity vector, or orientation), scale, geometric information, and shape information. Accordingly, MIDMRs provide significantly richer data for performing a visual search.

According to various embodiments, MIDMRs can be compact and searchable, such that they can be used effectively in visual search. MIDMRs can be generated by various methods of aggregating information from multiple viewpoints. Examples of such aggregation methods can include max/average pooling, bag of words, vector of locally aggregated descriptors (VLAD), and/or fisher vectors.

In particular embodiments, visual search using MIDMRs can be performed between MIDMRs (i.e. use one MIDMR to search for other MIDMRs) or between MIDMRs and other types of digital media, such as images, text, videos, voice, or 3D models. For visual search using other types of digital media, the search can be done in either direction. For instance, an MIDMR can be used to search for images or an image can be used to search for MIDMRs. Although the present example describes using an MIDMR to search through stored MIDMRs, other types of MIDMRs or digital media representations can also be used in visual search as described in this disclosure.

In the present example, a process for performing a visual search using MIDMRs 1100 begins when the system receives a visual search query for an object to be searched at 1102. The visual search query includes a first MIDMR of the object to be searched, where the first MIDMR includes spatial information, scale information, and different viewpoint images of the object. According to various embodiments, the spatial information can include depth information, visual flow between the different viewpoints, and/or three-dimensional location information. In some instances, the scale information can be estimated using accelerometer information obtained when capturing the first MIDMR. Additionally, in some examples, the scale information can be determined using inertial measurement unit (IMU) data obtained when capturing the first MIDMR. Furthermore, in some examples, the first MIDMR of the object may also include three-dimensional shape information.

Different types of visual search can be performed such as live search, selective search, parameterized search, and viewpoint aware search. Any of these types of searches can be performed within the scope of this disclosure. In particular, live search includes a process that occurs during a session in which the search can happen incrementally or at once. During an incremental search, a subset of the available viewpoints is first used to perform an initial search. This search is then refined using more and more viewpoints in an iterative process. For instance, live search can be performed in real-time while an MIDMR is being captured. Further descriptions of selective search, parameterized search, and viewpoint aware search are described below with regard to latter figures. These types of search may also be integrated into the present example, within the scope of this disclosure. Specifically, any of these types of search or any combination of these types of search can be used with the current example.

Next, at 1104, the first MIDMR is compared to a plurality of stored MIDMRs. In particular, spatial information and scale information of the first MIDMR is compared to spatial information and scale information of the stored MIDMRs. In some examples, the first MIDMR of the object is compared to one or more stored MIDMRs without generating a 3D model of the object. In other examples, a 3D model may be generated and used for comparing the MIDMRs.

In the present example, the stored MIDMRs include a second MIDMR. This second MIDMR is generated by aggregating spatial information, scale information, and different viewpoint images obtained when capturing the second MIDMR. In some instances, different viewpoint images obtained when capturing the second MIDMR can be aggregated using an algorithm such as pooling, bag of words, vector of locally aggregated descriptors (VLAD), and fisher vectors. In the present embodiment, this second MIDMR is a possible match for the first MIDMR based on the comparison of spatial and scale information between the two MIDMRs.

According to various examples, a correspondence measure is generated at 1106 that indicates the degree of similarity between the first MIDMR and the second MIDMR. For instance, the degree of similarity may include a percentage that represents the amount of correlation between the MIDMRs. This correspondence measure can be used in different ways depending on the desired application. In particular, the correspondence measure can be calculated for multiple stored MIDMRs and the ones with the highest degree of similarity can be selected as search results to be returned to the user. In some examples, each stored MIDMR that is compared to the first MIDMR can have a correspondence measure calculated for it. Furthermore, in some examples, the correspondence measure can be used to rank the search results by relevancy. In some examples, the correspondence measure can be displayed with search results as a response to the visual search query. However, in other examples, the correspondence measure may be used only by the system to determine matches and not displayed to the user with search results.

In the present example, once one or more matches are found, the search results are transmitted to the user at 1108. In particular, if the second MIDMR is found to be a match, an image associated with the second MIDMR is transmitted in response to the visual search query. This image may include a thumbnail and/or link associated with the second MIDMR. In particular, the link may allow the user to view the second MIDMR to determine if this is an appropriate match. Furthermore, additional information may be included with the image in some instances, such as information about the item, source of the item, where to purchase the item, etc.

Although particular features have been described as part of each example in the present disclosure, any combination of these features or additions of other features are intended to be included within the scope of this disclosure. Accordingly, the embodiments described herein are to be considered as illustrative and not restrictive. Furthermore, although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the inven-

The invention claimed is:

1. A method comprising;
receiving via a communications interface at a server a visual feature tagging request for a first multi-view interactive digital media representation (MIDMR) of an object generated at a mobile computing device, the first MIDMR of the object including spatial information determined at least in part based on inertial data captured from an inertial measurement unit (IMU) as the mobile computing device moves along a path through space relative to the object, the first MIDMR of the object also including a plurality of different viewpoint images of the object captured as the mobile computing device moves along the path, the first MIDMR of the object also including a three-dimensional model of the object separated from scenery around the object;
identifying via a processor a visual feature in the first MIDMR of the object based at least in part on the spatial information and the three-dimensional model, wherein the visual feature represents a physical location on the object, wherein the visual feature appears in a first one of the viewpoint images at a first location and in a second one of the viewpoint images at a second location, wherein identifying the visual feature comprises comparing the first MIDMR with a plurality of reference MIDMRs, each reference MIDMR including a respective one or more visual feature tags that identifies a respective one or more features in the respective reference MIDMR;
creating visual feature correspondence information that links information identifying the visual feature with the first location in the first viewpoint image and the second location in the second viewpoint image based at least in part on the spatial information and the three-dimensional model, wherein the spatial information comprises visual flow between the different viewpoint images and scale information estimated using accelerometer data obtained when capturing the first MIDMR; and
transmitting from the server via the communications interface a feature tag message associated with the first MIDMR in response to the feature tagging request, wherein the feature tag message identifies the visual feature in the first and second viewpoint images,
wherein the comparing the first MIDMR with the pluraliN of reference MIDMRs comprises comparing the scale information of the first MIDMR with scale information of the plurality of reference MIDMRs.

2. The method recited in claim 1, wherein identifying the visual feature comprises processing user input that identifies at least one of the first location and the second location.

3. The method recited in claim 1, wherein identifying the visual feature further comprises:
selecting a reference MIDMR that is similar to the first MIDMR,
identifying a reference visual feature associated with the reference MIDMR, and
locating the reference visual feature in the first MIDMR.

4. The method recited in claim 1, wherein identifying the visual feature comprises:
determining an object type associated with the object,
identifying a predefined visual feature associated with the object type, and
locating the predefined visual feature in the first MIDMR.

5. The method recited in claim 4, the method further comprising:
identifying a visual feature in a second MIDMR of the object, wherein the first MIDMR of the object represents the object at a first point in time and wherein the second MIDMR of the object represents the object at a second point in time.

6. The method recited in claim 5, the method further comprising:
comparing the visual feature in the first MIDMR of the object to the visual feature in the second MIDMR of the object to identify a change in the object between the first time and the second time.

7. The method recited in claim 6, wherein the object is a vehicle and wherein the change in the object represents damage to the object.

8. The method recited in claim 1, wherein the spatial information comprises depth information.

9. The method recited in claim 1, wherein the spatial information comprises three-dimensional location information.

10. The method recited in claim 1, wherein the MIDMR of the object further comprises three-dimensional shape information.

11. A system comprising:
memory configured to store a visual feature tagging request received at a server for a first multi-view interactive digital media representation (MIDMR) of an object, the first MIDMR of the object including spatial information determined at least in part based on inertial data captured from an inertial measurement unit (IMU) as a mobile computing device moves along a path through space relative to the object, the first MIDMR of the object also including a plurality of different viewpoint images of the object captured as the mobile computing device moves along the path, the first MIDMR of the object also including a three-dimensional model of the object separated from scenery around the object;
a processor configured to identify a visual feature in the first MIDMR of the object based at least in part on the spatial information and the three-dimensional model, wherein the spatial information comprises visual flow between the different viewpoint images and scale information estimated using accelerometer data obtained when capturing the first MIDMR, wherein the visual feature represents a physical location on the object, wherein the visual feature appears in a first one of the viewpoint images at a first location and in a second one of the viewpoint images at a second location, and to create visual feature correspondence information that links information identifying the visual feature with the first location in the first viewpoint image and the second location in the second viewpoint image based at least in part on the spatial information and the three-dimensional model, wherein identifying the visual feature comprises comparing the first MIDMR with a plurality of reference MIDMRs, each reference MIDMR including a respective one or more visual feature tags that identifies a respective one or more features in the respective reference MIDMR; and
a communications interface configured to transmit from the server a feature tag message associated with the first MIDMR in response to the feature tagging request, wherein the feature tag message identifies the visual feature in the first and second viewpoint images, wherein the comparing the first MIDMR with the plurality of reference MIDMRs comprises comparing the scale information of the first MIDMR with scale information of the plurality of reference MIDMRs.

12. The system recited in claim 11, wherein identifying the visual feature comprises:
   selecting a reference MIDMR that is similar to the first MIDMR,
   identifying a reference visual feature associated with the reference MIDMR, and
   locating the reference visual feature in the first MIDMR.

13. One or more non-transitory computer readable media having instructions stored thereon for performing a method, the method comprising:
   receiving via a communications interface at a server a visual feature tagging request for a first multi-view interactive digital media representation (MIDMR) of an object, the first MIDMR of the object including spatial information determined at least in part based on inertial data captured from an inertial measurement unit (IMU) as a mobile computing device moves along a path through space relative to the object, the first MIDMR of the object also including a plurality of different viewpoint images of the object captured as the mobile computing device moves along the path, the first MIDMR of the object also including a three-dimensional model of the object separated from scenery around the object;
   identifying via a processor a visual feature in the first MIDMR of the object based at least in part on the spatial information and the three-dimensional model, wherein the visual feature represents a physical location on the object, wherein the visual feature appears in a first one of the viewpoint images at a first location and in a second one of the viewpoint images at a second location, wherein identifying the visual feature comprises comparing the first MIDMR with a plurality of reference MIDMRs, each reference MIDMR including a respective one or more visual feature tags that identifies a respective one or more features in the respective reference MIDMR;
   creating visual feature correspondence information that links information identifying the visual feature with the first location in the first viewpoint image and the second location in the second viewpoint image based at least in part on the spatial information and the three-dimensional model, wherein the spatial information comprises visual flow between the different viewpoint images and scale information estimated using accelerometer data obtained when capturing the first MIDMR; and
   transmitting from the server via the communications interface a feature tag message associated with the first MIDMR in response to the feature tagging request, wherein the feature tag message identifies the visual feature in the first and second viewpoint images,
   wherein the comparing the first MIDMR with the plurality of reference MIDMRs comprises comparing the scale information of the first MIDMR with scale information of the plurality of reference MiDMRs.

14. The one or more non-transitory computer readable media recited in claim 13, wherein identifying the visual feature comprises:
   determining an object type associated with the object,
   identifying a predefined visual feature associated with the object type, and
   locating the predefined visual feature in the first MIDMR.

15. The one or more non-transitory computer readable media recited in claim 13, the method further comprising:
   identifying a visual feature in a second MIDMR of the object, wherein the first MIDMR of the object represents the object at a first point in time and wherein the second MIDMR of the object represents the object at a second point in time; and
   comparing the visual feature in the first MIDMR of the object to the visual feature in the second MIDMR of the object to identify a change in the object between the first time and the second time, wherein the object is a vehicle and wherein the change in the object represents damage to the object.

* * * * *